United States Patent [19]
Kuwana et al.

[11] Patent Number: 5,786,941
[45] Date of Patent: Jul. 28, 1998

[54] ZOOM LENS SYSTEM

[75] Inventors: Minoru Kuwana, Osaka; Hitoshi Hagimori, Nara-Ken; Junji Hashimura, Sakai, all of Japan

[73] Assignee: Minolta C., Ltd., Osaka, Japan

[21] Appl. No.: 499,297

[22] Filed: Jul. 7, 1995

[30] Foreign Application Priority Data

Jul. 8, 1994 [JP] Japan ................. 6-179742
Jul. 8, 1994 [JP] Japan ................. 6-179743

[51] Int. Cl.$^6$ ................................ G02B 15/14
[52] U.S. Cl. ............................. 359/683; 359/685
[58] Field of Search ....................... 359/685, 683

[56] References Cited

U.S. PATENT DOCUMENTS

| | | | |
|---|---|---|---|
| 3,817,600 | 6/1974 | Watanabe et al. | 359/685 |
| 4,196,969 | 4/1980 | Itoh | 359/685 |
| 4,576,444 | 3/1986 | Kawamura | 359/685 |
| 4,695,133 | 9/1987 | Kitagishi et al. | 359/685 |
| 4,749,265 | 6/1988 | Hattori et al. | 359/685 |
| 4,830,477 | 5/1989 | Takahashi et al. | 359/685 |
| 5,202,717 | 4/1993 | Ookubo et al. | 354/400 |
| 5,225,941 | 7/1993 | Saito et al. | 359/824 |

*Primary Examiner*—David C. Nelms
*Assistant Examiner*—Evelyn A. Lester
*Attorney, Agent, or Firm*—Price, Gess & Ubell

[57] ABSTRACT

A zoom lens system includes a plurality of lens units. First to third focal length zones are set according to the focal length. During focusing, in the first focal length zone, the lens units are moved at a first constant ratio, and in the third focal length zone, the lens units are moved at a second constant ratio which is different from the first constant ratio. In the second focal length zone, the movement ratio of the lens units varies according to the focal length.

11 Claims, 9 Drawing Sheets

ZOOM LENS SYSTEM

BACKGROUND OF THE INVENTION

1. Field of the Invention

The present invention relates to a zoom lens system using an electromechanically transducing device capable of separately controlling the positions of a plurality of lens units constituting a lens system.

2. Description of the Prior Art

The focusing methods of the taking lens of a camera and the like include the following methods: an entire lens moving out method to move out the entire taking lens system to perform focusing; a front lens moving out method to move out the front lens units included in the taking lens system to perform focusing; and an inner focusing method to move only some of the lens units constituting the taking lens system. Recently, the inner focusing method has frequently been used since the lens moving out amount is small so that the size of the lens system can be reduced.

In the inner focusing method, a focusing method called a floating method is sometimes employed in which to prevent the generation of aberrations due to focusing, at least two of the plurality of lens units constituting the taking lens system are moved along predetermined different loci. To move a plurality of lens units constituting the taking lens system along predetermined different loci, a cam mechanism has conventionally been used which has a cam cylinder having cam grooves formed thereon along the predetermined movement loci so that the pins of the lens holding frames are guided by the cam grooves. However, it is difficult to put into practice the above-mentioned arrangement where the lens units are moved by using the cam mechanism. This is because a so-called floating ratio is constant in the entire focal length range and a complicated structure is necessary to vary the floating ratio according to the focal length.

On the other hand, from the viewpoint of the optical performance, with the reduction in size and the shortest object distance, the floating method is effective in securing a necessary performance in the close photographic range in focusing. If the floating ratio is varied by zooming of a zoom lens system, a further improvement in performance is expected.

For this reason, an arrangement has been proposed in which a plurality of lens units constituting the lens system are each provided with a separate driving mechanism to separately control the plurality of lens units to make complicated floating movements.

In the arrangement to provide each of a plurality of lens units with a separate driving mechanism to separately control them, the floating ratio which is a ratio between the movement speeds of the lens units is varied according to the set focal length, which complicates the control.

In the floating method, changing the moved lens units according to the set focal length produces many advantages such that the optical performance of the lens improves and that the shortest object distance at which photographing is possible is reduced. However, changing the moved lens units according to set focal length is difficult to put into practice when it is performed by a cam mechanism which has widely been used conventionally to move lens units constituting a zoom lens system, since a complicated structure is necessary.

SUMMARY OF THE INVENTION

An object of the present invention is to provide a zoom lens system with which the movements of a plurality of lens units constituting the lens system are easily controlled, a plurality of floating ratios can be set, and the out-of-focus can be prevented by changing the floating ratio during zooming.

Another object of the present invention is to provide a zoom lens system capable of selecting and moving only necessary lens units according to focal length information and defocus information.

To achieve the above-mentioned objects, a zoom lens system of the present invention is provided with a plurality of lens units. First to third focal length zones are set according to a focal length. During focusing, in the first focal length zone, the lens units are moved at a first constant ratio, and in the third focal length zone, the lens units are moved at a second constant ratio which is different from the first constant ratio, and in the second focal length zone, a movement ratio of the lens units varies according to the focal length.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

[General Arrangements of the Lens]

Figure 1:
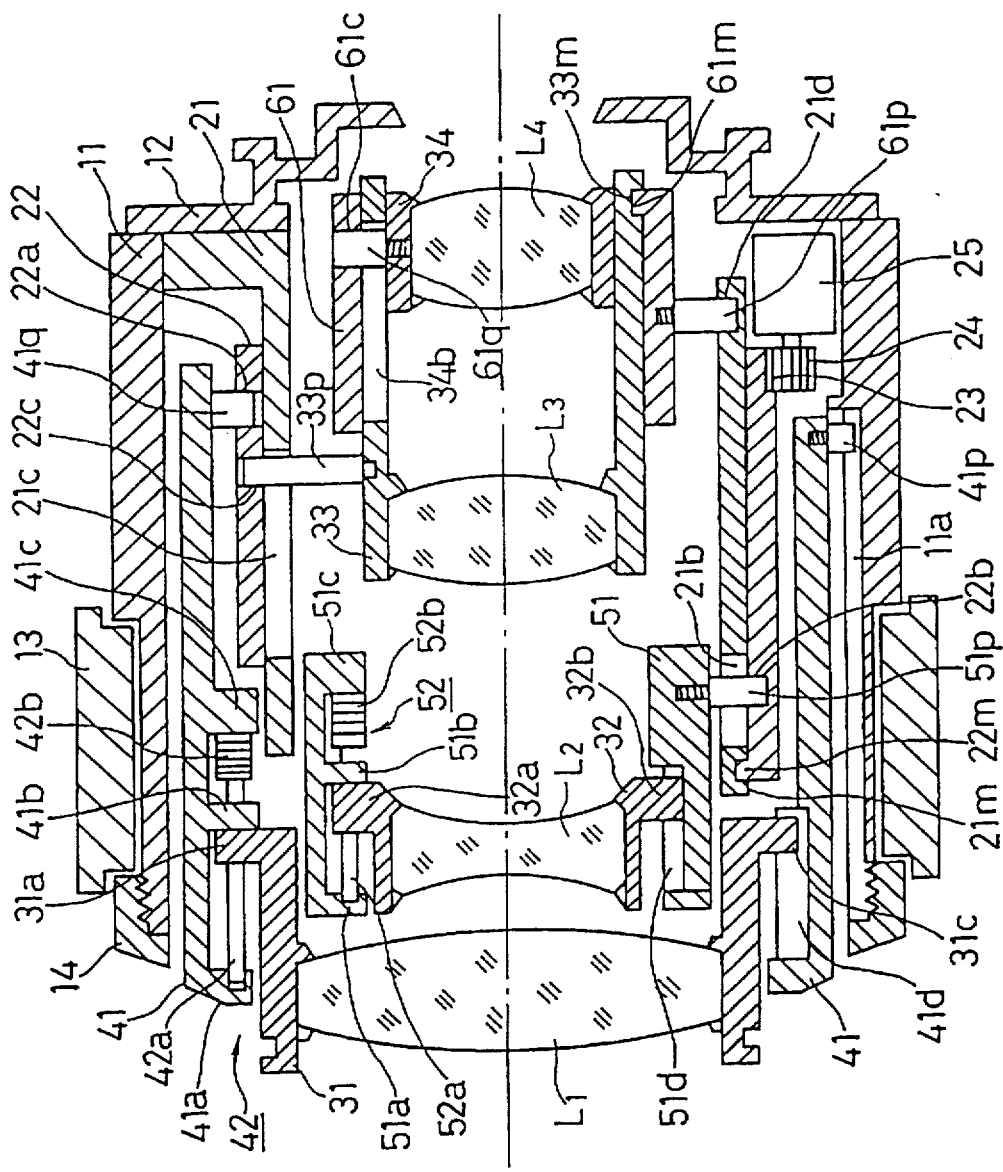
FIG. 1 is a cross-sectional view showing the arrangement of zoom lens system of the first embodiment of the present invention.

Referring to FIG. 1, there is shown a cross-sectional view of a zoom lens system of the first embodiment of the present invention. Reference numeral 11 represents an external barrel of the zoom lens system. Reference numeral 12 represents a mounting member for attaching the zoom lens system to the camera body. Reference numeral 13 represents a zoom operation ring which rotates on the external barrel 11. In this embodiment employing a power zoom mechanism, the zoom operation ring 13 is an operation ring for inputting the amount of driving of the zoom mechanism. Reference numeral 14 is a ring for preventing the zoom operation ring 13 from detaching.

Inside the external barrel 11, a fixed internal barrel 21 fixed to the external barrel 11 is arranged. A zoom cam ring 22 is provided on the periphery of the fixed internal barrel 21. A protrusion 22m formed on the inner surface of the zoom cam ring 22 along the circumference engages with a groove 21m formed in the fixed internal barrel 21, so that the zoom cam ring 22 is supported so as not to move along the optical axis but to be rotatable. The zoom cam ring 22 is also coupled to a zoom motor 25 through a driving mechanism including a driving gear 23 and a pinion 24 providing at one end of the zoom cam ring 22, so that the zoom cam ring 22 is rotated by the zoom motor 25.

The zoom lens system includes a first lens unit L1, a second lens unit L2, a third lens unit L3 and a fourth lens unit L4, which are held by a first lens unit holding frame 31, a second lens unit holding frame 32, a third lens unit holding frame 33 and a fourth lens unit holding frame 34, respectively.

A lens actuator 42 is integrally provided to a first lens unit moving frame 41. The first lens unit holding frame 31 is held by the first lens unit moving frame 41 through the lens actuator 42 so as to be movable along the optical axis. A lens actuator 52 is integrally provided to a second lens unit moving frame 51. The second lens unit holding frame 32 is held by the second lens unit moving frame 51 through the lens actuator 52 to be movable along the optical axis. The structures of the lens actuators will be described later in detail.

In the inner surface of the external barrel 11, a straight movement groove 11a having a bottom is formed to restrict the rotation of the first lens unit moving frame 41. The first lens unit moving frame 41 is provided with a pin 41p which engages with the straight movement groove 11a. The zoom cam ring 22a rotatably provided on the periphery of the fixed internal barrel 21 is provided with a cam groove 22a. The first lens unit moving frame 41 is provided with a pin 41q which engages with the cam groove 22a. With this arrangement, in response to the rotation of the zoom cam ring 22, the first lens unit moving frame 41 moves along the optical axis with its movement restricted by the cam groove 22a of the zoom cam ring 22 and the straight movement groove 11a of the external barrel 11.

The straight movement groove 11a in the inner surface of the external barrel 11, the cam groove 22a of the zoom cam ring 22 and the pins 41p and 41q of the first lens unit moving frame 41 are each formed at three positions along the circumference. Thereby, the first lens unit moving frame 41 is set at a precise position relative to the external barrel 11.

The fixed internal barrel 21 is provided with a straight movement groove 21b to restrict the rotation of the second lens unit moving frame 51. The zoom cam ring 22 rotatably provided on the periphery of the fixed internal barrel 21 is provided with a cam groove 22b. Since a pin 51p provided to the second lens unit moving frame 51 passes through the point of intersection of the straight movement groove 21b and the cam groove 22b, in response to the rotation of the zoom cam ring 22, the second lens unit moving frame 51 moves along the optical axis with its movement restricted by the cam groove 22b and the straight movement groove 21a like the first lens unit moving frame 41.

The fixed internal barrel 21 is further provided with a straight movement groove 21c to restrict the rotation of the third lens unit holding frame 33. The zoom cam ring 22 rotatably provided on the periphery of the fixed internal barrel 21 is provided with a cam groove 22c. Since a pin 33p provided to the third lens unit holding frame 33 passes through the point of intersection of the straight movement groove 21c and the cam groove 22c, in response to the rotation of the zoom cam ring 22, the third lens unit holding frame 33 moves along the optical axis with its movement restricted by the cam groove 22c and the straight movement groove 21b.

On the periphery of the third lens unit holding frame 33, a zoom cam ring 61 for the fourth lens unit is provided. A protrusion 61m formed on the inner surface of the zoom cam ring 61 along the circumference engages with a groove 33m formed on the outer surface of the third lens unit holding frame 33, so that the zoom cam ring 61 is supported by the third lens unit holding frame 33 so as not to move along the optical axis but to be rotatable.

The fixed internal barrel 21 is provided with a cam groove 21d to rotate the zoom cam ring 61. The zoom cam ring 61 is provided with a pin 61p which engages with the cam groove 21d. When, in response to the rotation of the zoom cam ring 22, the third lens unit holding frame 33 makes a straight movement along the optical axis by being guided by the straight movement groove 21c, the zoom cam ring 61 rotatably supported by the third lens unit holding frame 33 also moves along the optical axis. Since the pin 61p engages with the cam groove 21d of the fixed internal barrel 21 at this time, the zoom cam ring 61 moves along the optical axis while rotating with its movement restricted by the cam groove 21d and the straight movement groove 21c of the fixed internal barrel 21.

The fourth lens unit holding frame 34 is arranged inside the third lens unit holding frame 33. The third lens unit holding frame 33 is provided with a straight movement groove 34b to restrict the rotation of the fourth lens unit 34. The zoom cam ring 61 provided on the periphery of the third lens unit holding frame 33 is provided with a cam groove 61c. Since a pin 61q provided to the fourth lens unit holding frame 34 passes through the point of intersection of the straight movement groove 34b and the cam groove 61c, in response to the rotation of the zoom cam ring 61, the fourth lens unit holding frame 34 moves along the optical axis along the point of intersection of the cam groove 61c and the straight movement groove 34b.

[Structure of the Lens Actuator]

The lens actuator 42 and the lens actuator 52 have substantially the same structure. First, the lens actuator 42 will be described.

Figure 2:
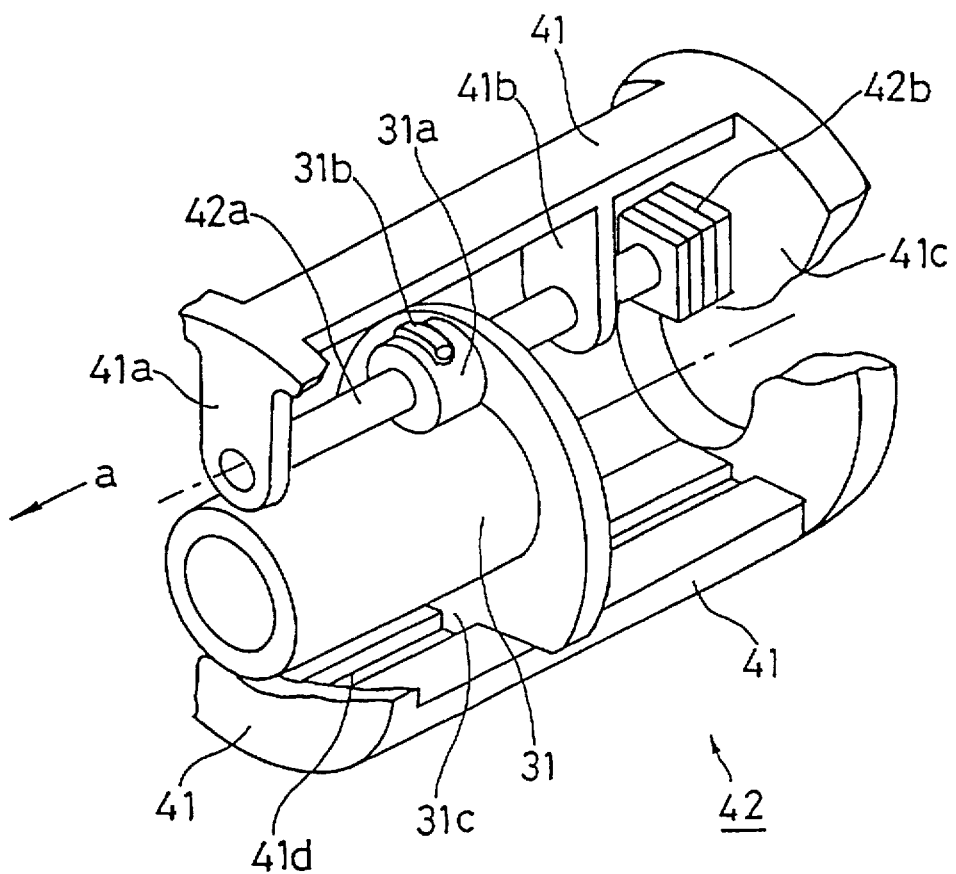
FIG. 2 is a broken perspective view showing a part of the structure of a lens actuator.

FIG. 2 is a broken perspective view of the lens actuator 42 which moves the first lens unit L1. The structure of the lens actuator 42 will be described with reference to FIGS. 1 and 2. The first lens unit moving frame 41 is provided with a driving shaft 42a which drives the first lens unit holding frame 31 along the optical axis and a guiding groove 41d which allows the first lens unit holding frame 31 to move along the optical axis but inhibits it from rotating. The driving shaft 42a is supported to be movable along the optical axis by a bearing 41a provided at the front end of the first lens unit moving frame 41 and a bearing 41b provided at an intermediate portion thereof. To one end of the driving shaft 42a, a piezoelectric device 42b is fixed. The other end of the piezoelectric device 42b is fixed to a flange 41c of the first lens unit moving frame 41.

Figure 3:
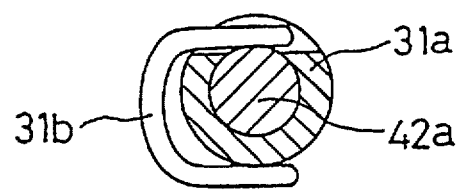
FIG. 3 is a cross-sectional view showing how a driving shaft and a contact member of the lens actuator are frictionally in contact with each other.

The first lens unit holding frame 31 is provided with a contact member 31a through which the driving shaft 42a passes. The contact member 31a and the driving shaft 42a are pressed against each other by a pressing spring 31b to be frictionally coupled to each other by an appropriate frictional force. FIG. 3 shows a cross section of a vicinity of the contact member 31a to show how the contact member 31a of the first lens unit holding frame 31 and the driving shaft 42a are pressed against each other by the pressing spring 31b. The first lens unit holding frame 31 is provided with a protrusion 31c which engages with the guiding groove 41d of the first lens unit moving frame 41.

Figure 4:
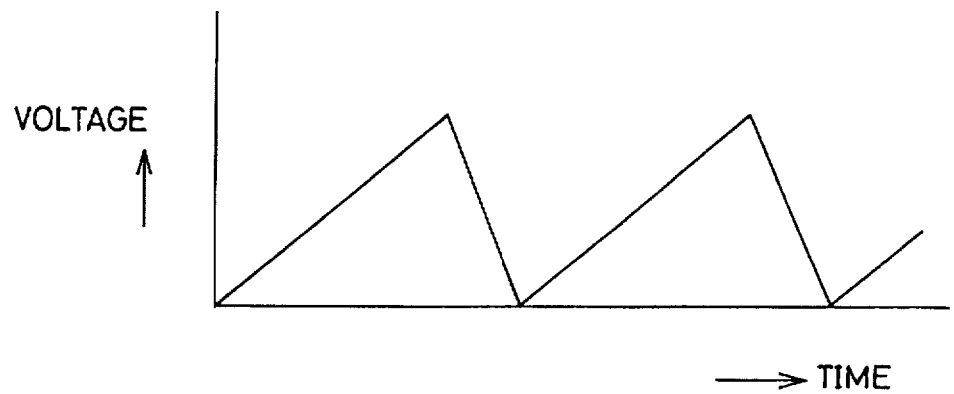
FIG. 4 shows a waveform of a driving pulse applied to the lens actuator.

In the above-described arrangement, when a driving pulse of a waveform as shown in FIG. 4 consisting of gentle rises and succeeding steep falls are applied to the piezoelectric device 42b, at the gentle rises of the driving pulse, the piezoelectric device 42b is gently stretched along the thickness, so that the driving shaft 42a is moved along the optical axis in the direction of arrow a. In response thereto, the contact member 31a of the first lens unit holding frame 31 which is frictionally coupled to the driving shaft 42a by being pressed there-against by the pressing spring 31b is also moved in the direction of arrow a, so that the first lens unit L1 is moved in the direction of arrow a.

At the steep falls of the driving pulse, the piezoelectric device 42b rapidly contracts along the thickness. At this time, the first lens unit L1 is not moved since the first lens unit holding frame 31 which is pressed against the driving shaft 42a by the pressing spring 31b substantially remains at that position because of its force of inertia against the frictional force generated with the driving shaft 42a.

The term "substantially remains" herein includes that in the direction of arrow a and in any directions opposite thereto, the second lens unit holding frame 32 follows the driving shaft 42 while sliding thereon and moves in the direction of arrow a as a whole according to the difference in driving time. The manner in which the lens unit is moved depends on the friction condition given.

By continuously applying the driving pulse of the above-described waveform to the piezoelectric device 42b, the first lens unit L1 is continuously moved in the direction of arrow a.

To move the first lens unit L1 in a direction opposite to the direction of arrow a, a driving pulse of a waveform consisting of steep rises and succeeding gentle falls is applied to the piezoelectric device 42.

The structure of the lens actuator 52 which moves the second lens unit L2 is the same as that of the lens actuator 42. Referring to FIG. 1, the second lens unit moving frame 51 is provided with a driving shaft 52a which drives the second lens unit holding frame 32 along the optical axis and a guiding groove 51d which allows the second lens unit holding frame 32 to move along the optical axis but inhibits it from rotating. The driving shaft 52a is supported to be movable along the optical axis by a bearing 51a provided at the front end of the second lens unit moving frame 51 and a bearing 51b provided at an intermediate portion thereof. To one end of the driving shaft 52a, a piezoelectric device 52b is fixed. The other end of the piezoelectric device 52b is fixed to a flange 51c of the second lens unit moving frame 51.

The second lens unit holding frame 32 is provided with a contact member 32a through which the driving shaft 52a passes. The contact member 32a and the driving shaft 52a are pressed against each other by a non-illustrated pressing spring to be frictionally coupled to each other by an appropriate frictional force. The second lens unit holding frame 32 is provided with a protrusion 32b which engages with the guiding groove 51d of the second lens unit moving frame 51.

In the above-described arrangement, like the case of the lens actuator 42, to move the second lens unit L2 toward the left of FIG. 1, a driving pulse of a waveform consisting of gentle rises and succeeding steep falls as shown in FIG. 4 is applied to the piezoelectric device 52b, and to move the second lens unit L2 toward the right of FIG. 1, a driving pulse of a waveform consisting of steep rises and succeeding gentle falls is applied to the piezoelectric device 52b.

[Control of the Zoom Lens System]

Figure 5:
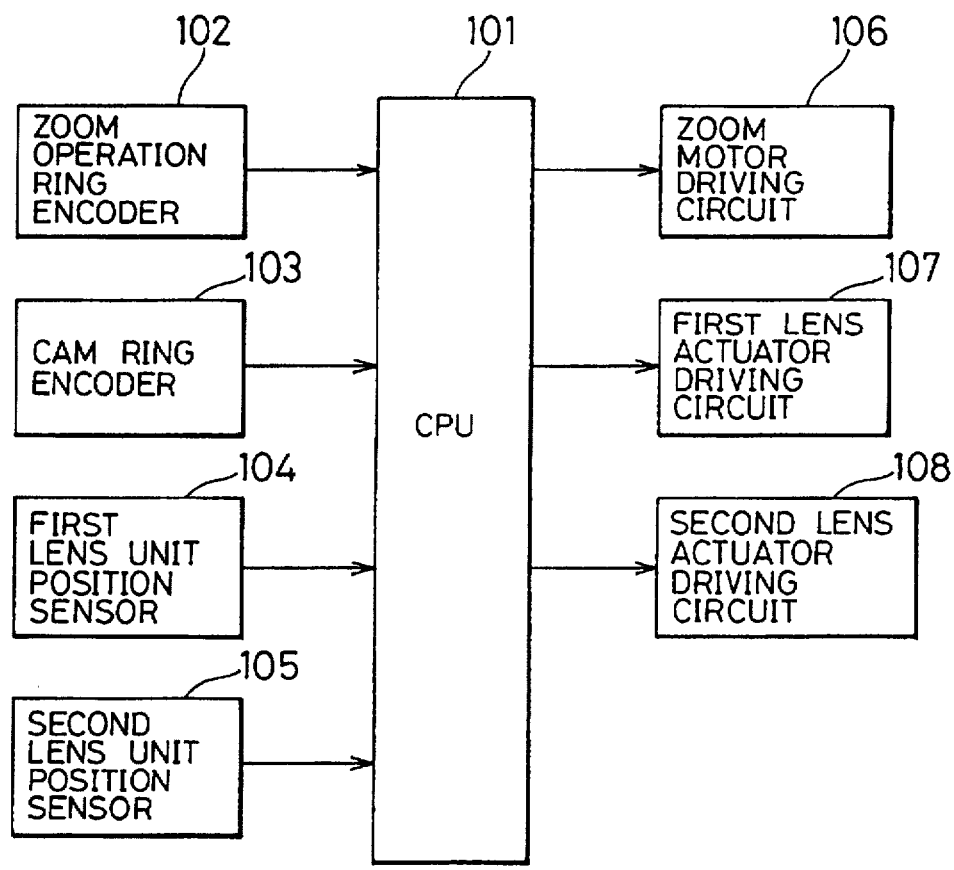
FIG. 5 is a block diagram of a zoom lens controlling circuit.

The control of the zoom lens system will be described. Referring to FIG. 5, there is shown a block diagram of a zoom lens controlling circuit. The controlling circuit includes the following: a central processing unit CPU 101; a zoom operation ring encoder 102 connected to an input port of the CPU 101 for detecting an angle of rotation of the zoom operation ring 13; a cam ring encoder 103 which detects an angle of rotation of the zoom cam ring 22; a first lens unit position sensor 104 which detects the position of the first lens unit; a second lens unit position sensor 105 which detects the position of the second lens unit; a zoom motor driving circuit 106 connected to an output port of the CPU 101; a first lens actuator driving circuit 107; and a second lens actuator driving circuit 108.

Although the structures of the encoders and sensors and how they are arranged in the lens mechanism are not shown, known encoders and sensors may be used and the persons skilled in the art could appropriately arrange them in the lens mechanism.

[Lens Controlling Operation]

First, a zooming controlling operation of the lens will be described. The optical system of the lens of the present invention is a vari-focal optical system where the moving out amount varies according to the set focal length.

Figure 6:
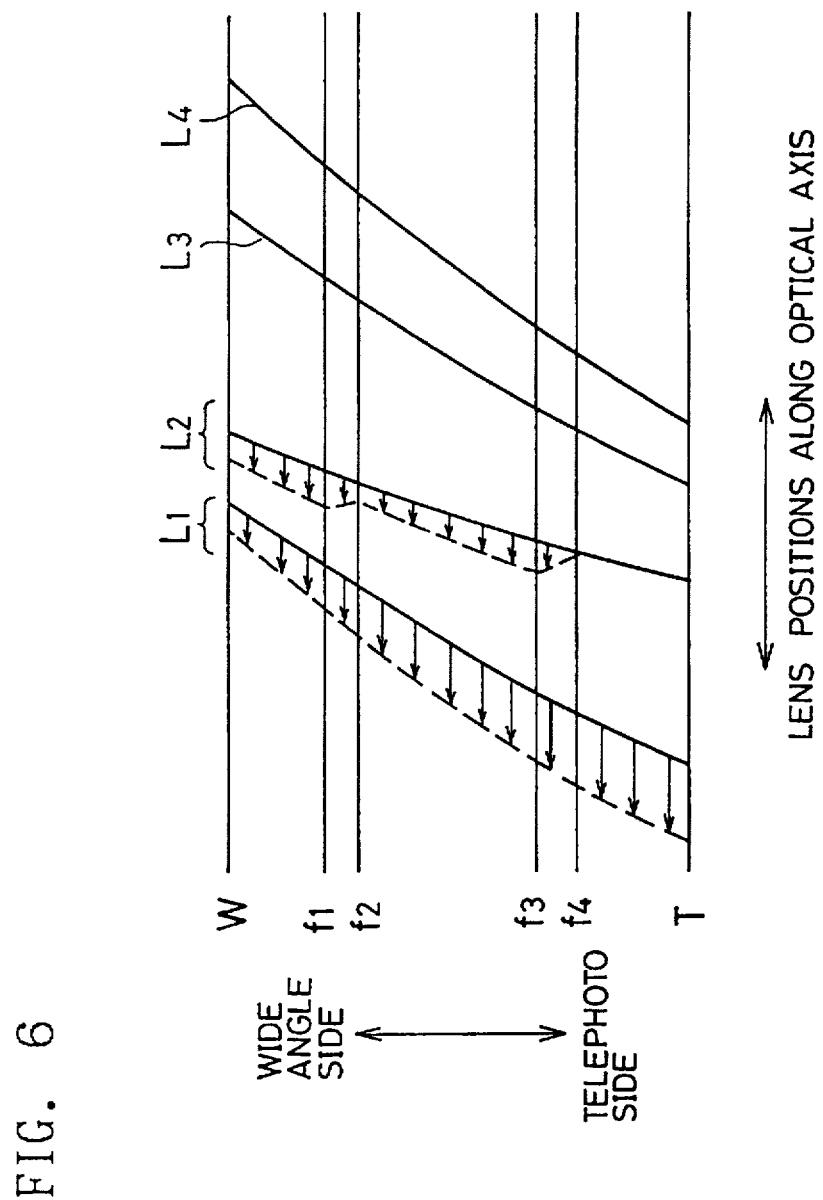
FIG. 6 is a view of assistance in explaining movement loci of lens units constituting the zoom lens system.

Referring to FIG. 6, there is shown a view of assistance in explaining set focal lengths of the lens and positions of the first lens unit L1, the second lens unit L2, the third lens unit L3 and the fourth lens unit L4, and a movement locus of each of the lens units which move according to the set focal length are shown.

In FIG. 6, a focal length range between the shortest focal length condition W and a focal length f1 is a zone where the floating ratio is 1:1, i.e. the moving out amounts of the first and second lens units L1 and L2 during focusing are the same, and a focal length range between focal lengths f2 and f3 is a zone where the floating ratio is 2:1.

A focal length range between the focal lengths f1 and f2 and a focal length range between the focal lengths f3 and f4 are subsequently described focus pattern changing zones where radical changes of the focusing lens system are moderated. A focal length range between a focal length f4 and the longest focal length condition T is a zone where only the first lens unit L1 is moved (i.e. the front lens unit is moved out) to set the focal length. In this zone, the second lens unit L2 is not moved.

When the subject is at infinity, an operation the same as that of a conventional zoom lens system is performed. Specifically, when the photographer rotates the zoom operation ring 13 to start zooming, the angle of rotation of the zoom operation 13 is detected by the zoom operation ring encoder 102, so that the CPU 101 drive the zoom motor 25 in accordance with the detected angle of rotation. The rotation of the zoom motor 25 rotates the zoom cam ring 22 through the pinion 24 and the driving gear 23.

Since the zoom cam rings 22 and 61 are provided with the cam grooves 22a, 22b, 22c, 22d and 61c corresponding to the zooming loci as shown in FIG. 6, the first lens unit L1, the second lens unit L2, the third lens unit L3 and the fourth lens unit L4 move along the cam grooves as shown by the solid lines of FIG. 6, whereby zooming is performed.

When the subject is located at an intermediate finite distance and the focusing lens system is focused on the subject at the finite distance, the moving out positions at which the focusing lens system is precisely focused on the subject are the positions shown by the broken lines of FIG. 6, which positions are slightly shifted from the positions decided by the cam grooves of the zoom cam rings. Therefore, it is necessary to make a vari-focal correction by moving out or moving in the first and second lens units L1 and L2 in zooming and the lens actuators are used for the correction.

The information on the position of the focusing lens system in accordance with the focal length can be obtained, for example by storing the moving out positions decided for every focal length in a memory or by performing a calculation based on the set focal length.

A focal length f is detected one by one by the cam ring encoder 103 during zooming and the detected focal length is inputted to the CPU 101. Then, the position of the focusing lens system corresponding to the focal length is read out from a memory such as a read only memory (ROM) or calculated to obtain the pulse number to drive the lens actuators 42 and 52. Then, the lens actuators 42 and 52 are supplied with the necessary driving pulses through the first and second lens actuator driving circuits 107 and 108 to set the first and second lens units L1 and L2 at the desired positions. Thereby, the first and second lens units L1 and L2 are moved out or moved in according to the set focal length to make the vari-focal correction, so that the first and second lens units L1 and L2 are set at the positions without any position shift as shown by the broken lines of FIG. 6.

Subsequently, an in-focus controlling operation of the lens will be described. In this lens, an output of the cam ring encoder 103 is inputted to the CPU 101 so that the focal length f is detected one by one during zooming. Assume now that the focal length f is between the shortest focal length condition W and the focal length f1 of FIG. 6. At this time, the CPU 101 determines that the moving out amounts of the first and second lens units L1 and L2 are in the one-to-one ratio range and obtains the moving out amounts based on the defocus amount for the target subject by a known method (e.g. by multiplying the defocus amount by a moving out amount converting coefficient) to obtain the pulse number to drive the lens actuators. Then, the lens actuators 42 and 52 are supplied with the necessary driving pulse through the first and second lens actuator driving circuits 107 and 108 to move out the first and second lens units L1 and L2 by the same amount, so that the first and second lens units L1 and L2 are set at the desired positions.

Likewise, when the focal length f is between the focal lengths f2 and f3 of FIG. 6, the CPU 101 determines that the moving out amounts of the first and second lens units L1 and L2 are in the two-to-one ratio range and moves out the first and second lens units L1 and L2 by the necessary amounts to set them at the desired positions.

When the focal length f is between the focal length f4 and the longest focal length condition T, only the first lens unit L1 is moved (i.e. the front lens unit is moved out) as mentioned previously.

As described previously, the focal length ranges between the focal lengths f1 and f2 and between the focal lengths f3 and f4 are changing zones where the floating ratio radically changes. In the range between the focal lengths f1 and f2, the moving out amount ratio is changed from 1:1 to 2:1. In the range between the focal lengths f3 and f4, the moving out amount ratio is changed from 2:1 to 1:0.

In these changing zones, the moving out amounts gradually vary according to the focal length. The changing zones are provided to remove the breaks caused by the radical change in making the vari-focal correction to drive the focusing lens system during zooming. For example, if the range between the focal lengths f3 and f4 is absent, in zooming from the shortest to the longest focal length conditions, it will be necessary to drastically (instantaneously) return the second lens unit L2 to the infinity position at the focal length f3.

When the set focal length is in one of the changing zones, the focal lengths in the range are finely distinguished and the ratio between the moving out amounts of the first and second lens units L1 and L2 is decided according to the finely distinguished focal lengths and stored in a memory such as a ROM. Then, a moving out amount ratio is read out from the memory according to the detected focal length to control the positions of the first and second lens units L1 and L2. The lens positions may be controlled by deciding the moving out amount ratio through a calculation according to the detected focal length every time the focal length is detected.

In these changing zones, the floating ratio continuously varies. However, since the widths of the changing zones are set to be narrow compared to normal zones, the control of the entire lens system is easily performed.

As described above, according to the first embodiment, the following focal length zones are set for a plurality of lens units: a plurality of focal length zones in which the lens units move at at least two different movement ratios; and a third focal length zone set between the two focal length ranges of different movement ratios. In the third focal length zone, since the lens units are moved at a movement ratio decided according to the set focal length, the lens units are moved without being radically moved, so that on the wide angle side or the telephoto side which is set during zooming, in-focus state is always obtained.

Hereinafter, the second embodiment of the present invention will be described.

[General Arrangement of the Lens]

Figure 7:
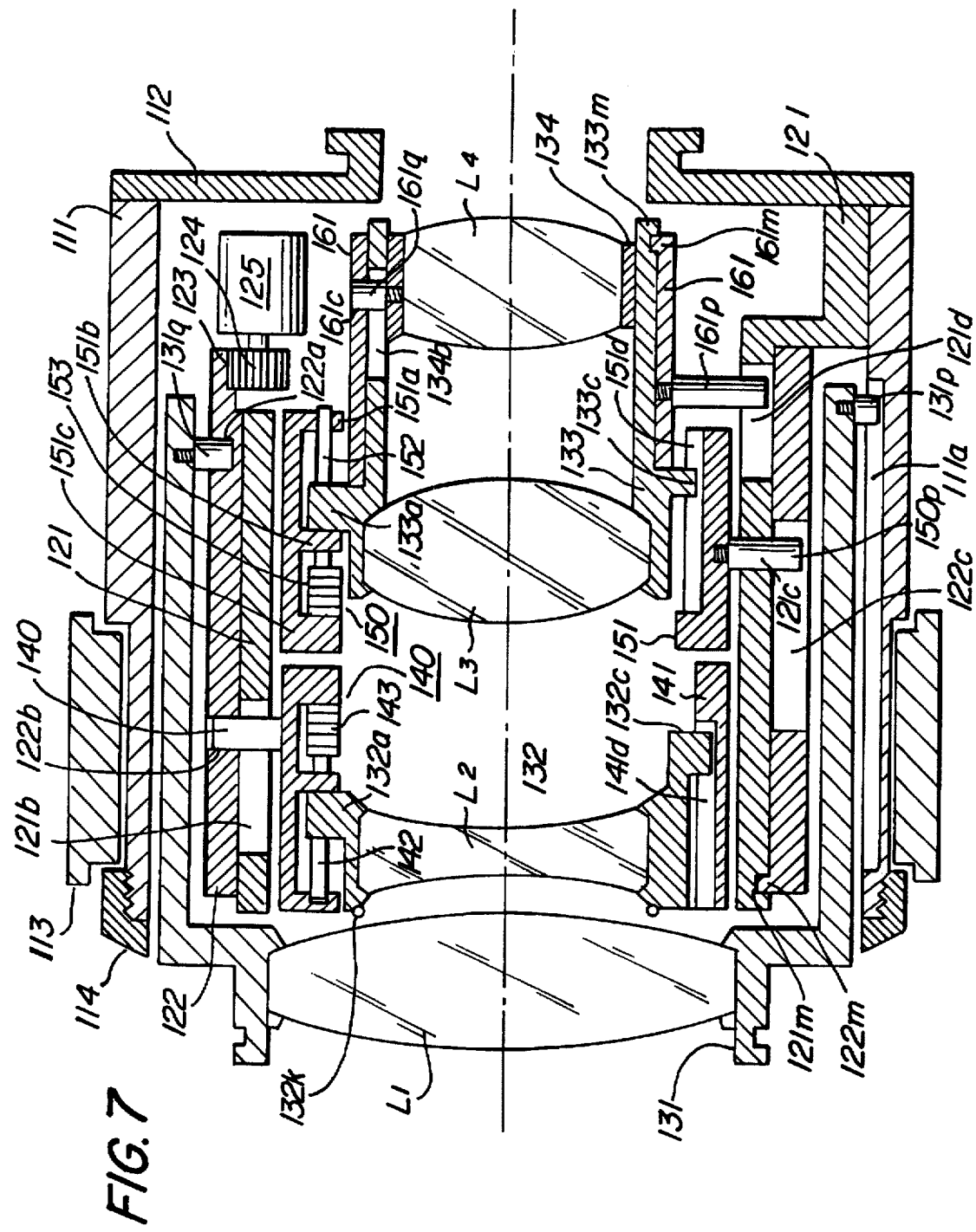
FIG. 7 is a cross-sectional view showing the arrangement of a zoom lens system of the second embodiment of the present invention.

Referring to FIG. 7, there is shown a cross-sectional view of a zoom lens system of the second embodiment of the present invention. Reference numeral 111 represents an external barrel of the zoom lens system. Reference numeral 112 represents a mounting member for attaching the zoom lens system to the camera body. Reference numeral 113 represents a zoom operation ring which rotates on the external barrel 111. In this embodiment employing a power zoom mechanism, the zoom operation ring 113 is an operation ring for inputting the amount of driving of the zoom mechanism. Reference numeral 113 is a ring for preventing the zoom operation ring 114 from detaching.

Inside the external barrel 111, a fixed internal barrel 121 fixed to the external barrel 111 is arranged. A zoom cam ring 122 is provided on the periphery of the fixed internal barrel 121. A protrusion 122m formed on the inner surface of the zoom cam ring 122 along the circumference engages with a groove 121m formed in the fixed internal barrel 121, so that the zoom cam ring 122 is supported so as not to move along the optical axis but to be rotatable. The zoom cam ring 122 is also coupled to a zoom motor 125 through a driving mechanism including a driving gear 123 and a pinion 124 providing at one end of the zoom cam ring 122, so that the zoom cam ring 122 is rotated by the zoom motor 125.

The zoom lens system includes a first lens unit L1, a second lens unit L2, a third lens unit L3 and a fourth lens unit L4, which are held by a first lens unit holding frame 131, a second lens unit holding frame 132, a third lens unit holding frame 133 and a fourth lens unit holding frame 134, respectively.

In the inner surface of the external barrel 111, a straight movement groove 111a having a bottom is formed to restrict the rotation of the first lens unit holding frame 131. The first lens unit holding frame 131 is provided with a pin 131p which engages with the straight movement groove 111a. The zoom cam ring 122a rotatably provided on the periphery of the fixed internal barrel 121 is provided with a cam groove 122a. The first lens unit holding frame 131 is provided with a pin 131q which engages with the cam groove 122a. With this arrangement, in response to the rotation of the zoom cam ring 122, the first lens unit holding frame 131 moves along the cam groove 122a along the optical axis.

The straight movement groove 111a in the inner surface of the external barrel 111, the cam groove 122a of the zoom cam ring 122 and the pins 131p and 131q of the first lens unit holding frame 131 are each formed at three positions along the circumference. Thereby, the first lens unit holding frame 131 is set at a precise position relative to the external barrel 111.

A lens actuator 140 is held inside the fixed internal barrel 121 to be movable along the optical axis. The fixed internal barrel 121 is provided with a straight movement groove 121b which restricts the rotation of the lens actuator 140. The zoom cam ring 122 rotatably provided on the periphery of the fixed internal barrel 121 is provided with a cam groove 122b. Since a pin 140p provided to the lens actuator 140 passes through the point of intersection of the straight movement groove 121b and the cam groove 122b, in response to the rotation of the zoom cam ring 122, the lens actuator 140 moves along the optical system along the cam groove 122b. Inside the lens actuator 140, a second lens unit holding frame 132 is supported to be movable along the optical axis.

A lens actuator 150 is supported inside the fixed internal barrel 121 to be movable along the optical axis. The fixed internal barrel 121 is provided with a cam groove 121c. The zoom cam ring 122 rotatably provided on the periphery of the fixed internal barrel 121 is provided with a straight movement groove 122c. Since a pin 150p provided to the lens actuator 150 passes through the point of intersection of the straight movement groove 122c and the cam groove 121c, in response to the rotation of the zoom cam ring 122, the lens actuator 150 moves along the optical axis along the cam groove 121c of the fixed internal barrel while rotating. Inside the lens actuator 150, a third lens unit holding frame 133 is supported to be movable along the optical axis. The lens actuator 140 and the lens actuator 150 have substantially the same structure as the lens actuators 42 and 52 of the first embodiment have.

On the periphery of the third lens unit holding frame 133, a zoom cam ring 161 for the fourth lens unit is provided. A protrusion 161m formed on the inner surface of the zoom cam ring 161 along the circumference engages with a groove 133m formed on the outer surface of the third lens unit holding frame 133, so that the zoom cam ring 161 is supported by the third lens unit holding frame 122 so as not to move along the optical axis but to be rotatable.

The fixed internal barrel 121 is provided with a straight movement groove 121d which restricts the rotation of the zoom cam ring 161. The zoom cam ring 161 is provided with a pin 161p which engages with the straight movement groove 121d of the fixed internal barrel 121. When the lens actuator 150 moves along the optical axis along the cam groove 121c of the fixed internal barrel 121 while rotating, the third lens unit holding frame 133 also moves along the optical axis while rotating, so that the zoom cam ring 161 which is rotatably supported by the third lens unit holding frame 133 also moves along the optical axis. At this time, since the pin 161p engages with the straight movement groove 121d of the fixed internal barrel 121, the rotation of the zoom cam ring 161 is restricted.

The fourth lens unit holding frame 134 is arranged inside the third lens unit holding frame 133. The third lens unit holding frame 133 is provided with a straight movement groove 134b to restrict the rotation of the fourth lens unit 134. The zoom cam ring 161 provided on the periphery of the third lens unit holding frame 133 is provided with a cam groove 161c. Since a pin 161q provided to the fourth lens unit holding frame 134 passes through the point of intersection of the straight movement groove 134b and the cam groove 161c, when the third lens unit holding frame 133 moves along the optical axis while rotating, the fourth lens unit holding frame 134 moves along the cam groove 161c of the zoom cam ring 161 along the optical axis relative to the third lens unit holding frame 133.

When the lens is set at the wide angle side where the first lens unit L1 and the second lens unit L2 are close to each other, the first lens unit L1 and the second lens unit L2 may collide with each other due to a shock and the like. For this reason, the second lens unit holding frame 132 which faces the first lens unit L1 is provided with a buffer 132k made of an elastic material.

In the above-described arrangement, by continuously applying the driving pulse of the waveform as shown in FIG. 4 to the piezoelectric device 143, the second lens unit L2 is continuously moved in the direction of arrow a.

To move the second lens unit L2 in a direction opposite to the direction of arrow a, a driving pulse of a waveform consisting of steep rises and succeeding gentle falls is applied to the piezoelectric device 143.

Like the case of the lens actuator 140, to move the third lens unit L3 and the fourth lens unit L4 toward the right of FIG. 7, a driving pulse of a waveform consisting of gentle rises and succeeding steep falls as shown in FIG. 4 is applied to the piezoelectric device 153, and to move the third lens unit L3 and the fourth lens unit L4 toward the left of FIG. 7, a driving pulse of a waveform consisting of steep rises and succeeding gentle falls is applied to the piezoelectric device 153.

[Control of the Zoom Lens System]

Figure 8:
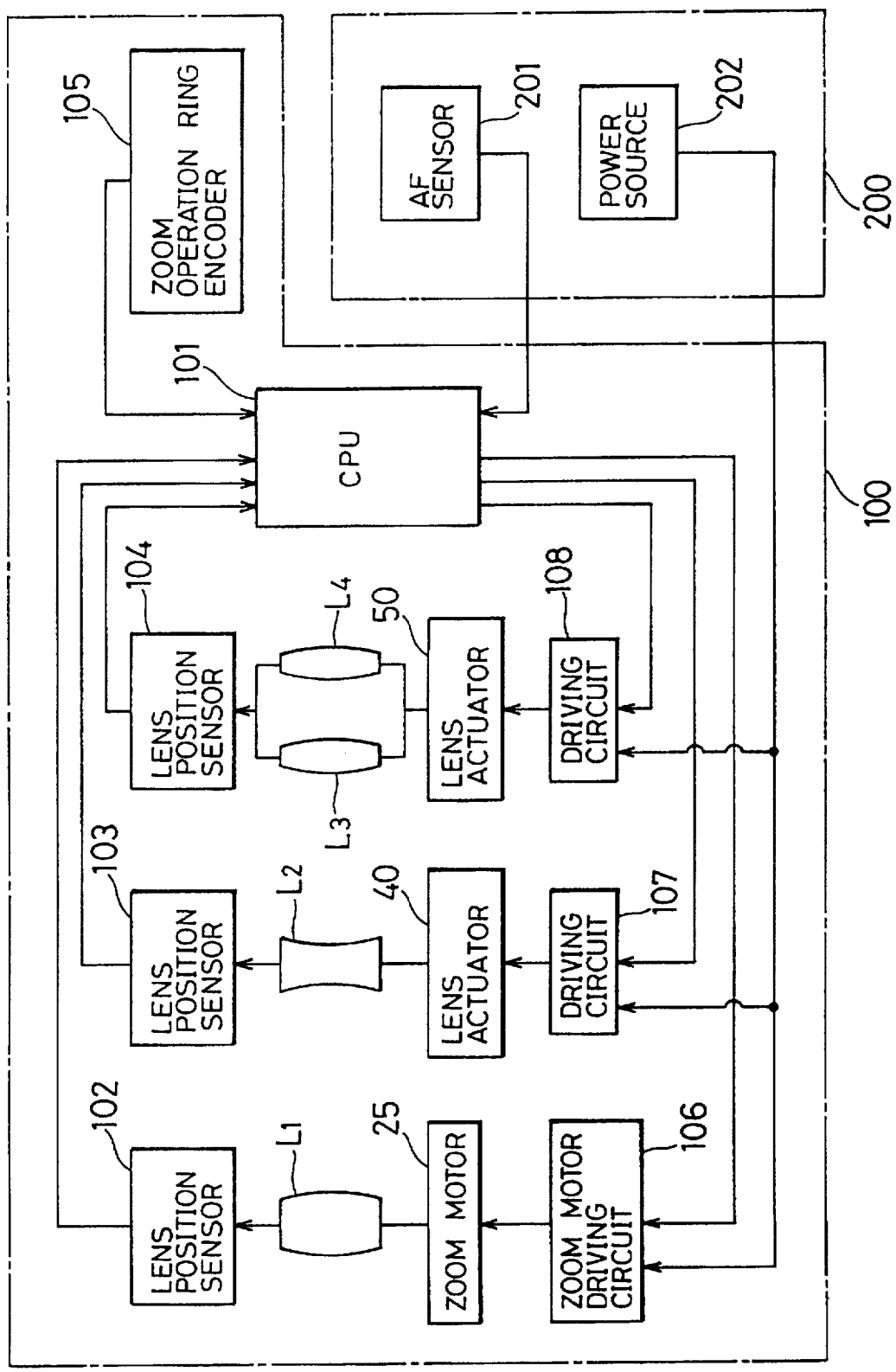
FIG. 8 is a block diagram of a zoom lens controlling circuit.

The control of the zoom lens system will be described. Referring to FIG. 8, there is shown a block diagram of a zoom lens controlling circuit. Reference numeral 100 represents a controlling circuit provided in the lens. Reference numeral 200 represents a controlling circuit provided in the camera. The controlling circuit 100 in the lens includes the following: a CPU 101; a lens position sensor 102 connected to an input port of the CPU 101 to detect the position of the first lens unit; a lens position sensor 103 which detects the position of the second lens unit; a lens position sensor 104 which detects the positions of the third and fourth lens units; a zoom operation ring encoder 105 which detects an angle of rotation of the zoom operation ring 113; a zoom motor driving circuit 106 connected to an output port of the CPU 101; a driving circuit 107 which drives the first lens actuator 140; and a driving circuit 108 which drives a second lens actuator 150. Concerning the controlling circuit 200 in the camera, only an autofocus (AF) sensor 201 and a power source 202 necessary for describing the embodiment are shown.

Although the structures of the encoders and sensors and how they are arranged in the lens are not shown, known encoders and sensors may be used and the persons skilled in the art could appropriately arrange them in the lens mechanism.

[Lens Controlling Operation]

Figure 9:
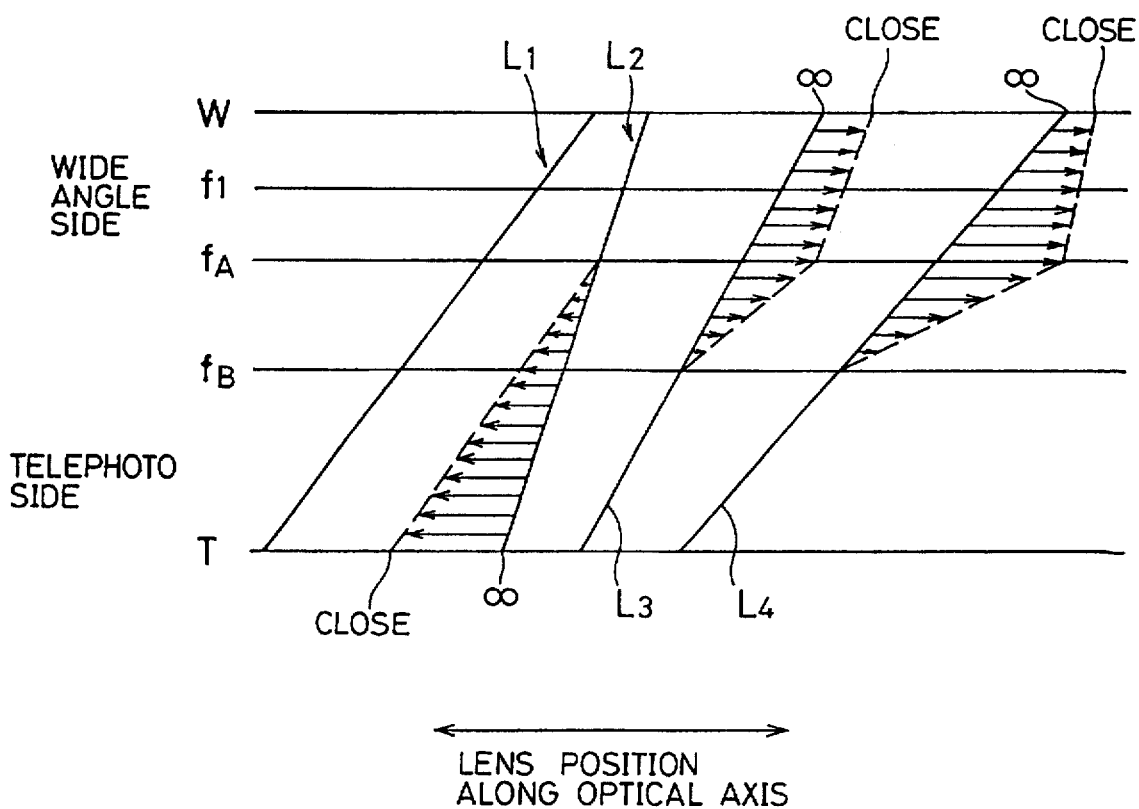
FIG. 9 is a view of assistance in explaining movement loci of lens units constituting the zoom lens system.

Referring to FIG. 9, there is shown a view of assistance in explaining set focal lengths of the lens and positions of the first lens unit L1, the second lens unit L2, the third lens unit L3 and the fourth lens unit L4, and a movement locus of each of the lens units which move according to the set focal length are shown. The movement loci shown by the solid lines are movement loci by the zoom cams and show the condition at the infinity focus position. The movement loci shown by the dotted lines are movement loci by the lens actuators and show the condition at the closest focus position.

As is apparent from FIG. 9, according to the present invention, when the set focal length of the lens is between the shortest focal length condition W and a focal length fA (this range will be referred to as a rear focus zone), the lens is focused on a subject located between the infinity position and the closest position by moving only the third and fourth lens units L3 and L4. When the set focal length is between the longest focal length condition T and a focal length fB (this range will be referred to as an internal focus zone), the lens is focused on a subject located between the infinity position and the closest position by moving only the second lens unit L2.

When the set focal length is between the focal lengths fA and fB (this range will be referred to as an internal/rear focus zone), the lens is focused on a subject located between the infinity position and the closest position by moving both the second lens unit L2 and the third and fourth lens units L3 and L4. In this zone, the ratio of moving out amount among the second lens unit L2, the third lens unit L3 and the fourth lens unit L4 varies according to the set focal length. The moving out amount according to the focal length is stored in a memory such as a ROM in advance. Instead of storing the moving out amount according to the focal length in a memory such as a ROM in advance, the moving out amount may be obtained as a function of the focal length through a calculation.

Both the second lens unit L2 and the third and fourth lens units L3 and L4 are moved to obtain in-focus condition in this zone in order to smoothly change the movements of the lens units before and behind the zone changing point. If the internal/rear focus zone which is an intermediate zone is absent, for example, when zooming is performed from the shortest focal length condition W to the longest focal length condition T, before and behind of the changing point of the focal length fA, it will be necessary to move the third and fourth lens units L3 and L4 instantaneously from the moving out position to the infinity position and to move the second lens unit L2 instantaneously from the infinity position to the moving out position.

Figure 10:
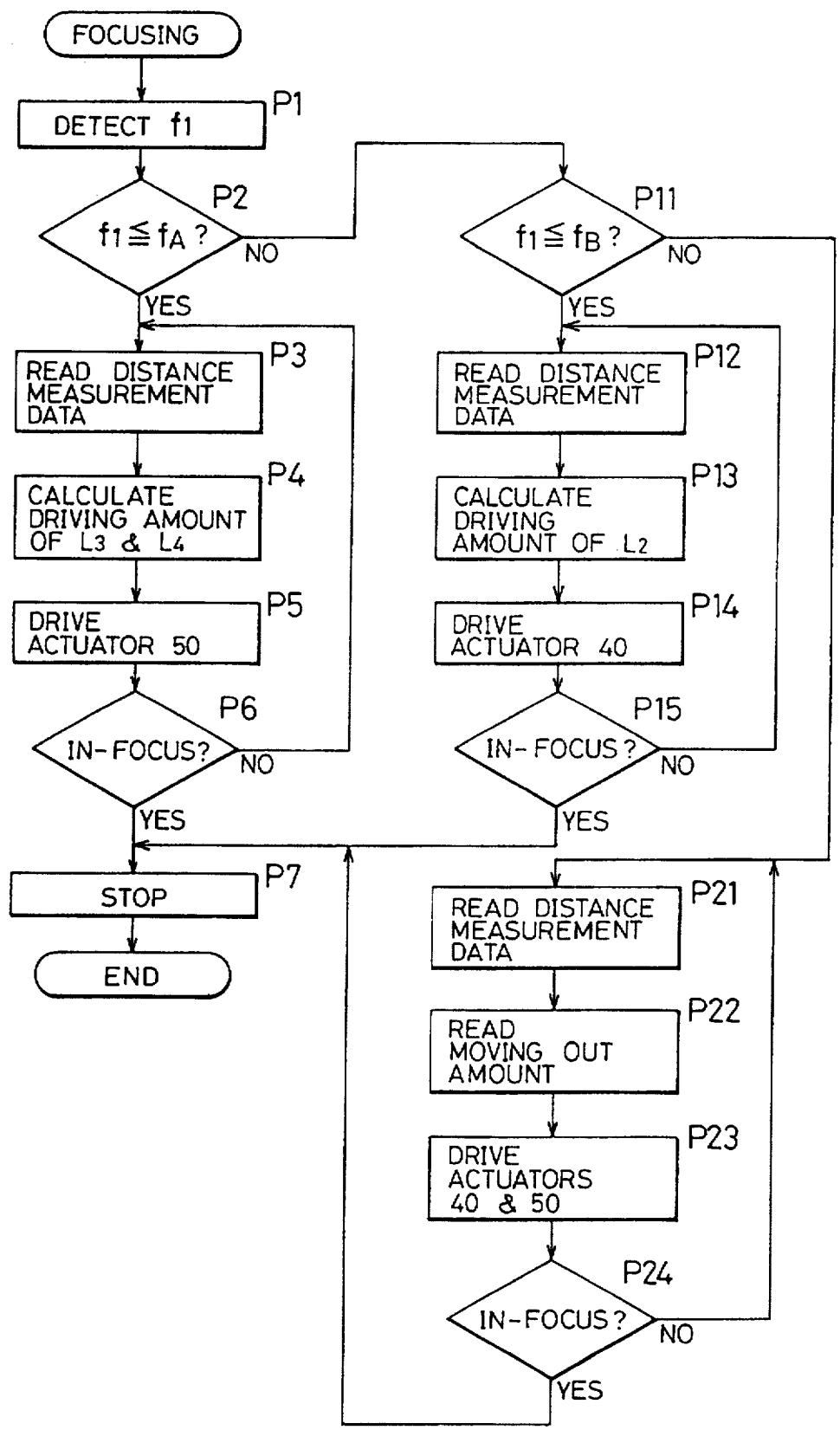
FIG. 10 is a flowchart of a focusing operation executed by the zoom lens controlling circuit.

Lens focusing operation will be described. Referring to FIG. 10, there is shown a flowchart of a focusing operation executed by the CPU 101. The presently-set focal length f1 is detected from the position of the first lens unit L1 which is continually detected by the lens position sensor 102 (step P1) and whether the set focal length f1 is between the shortest focal length W and the focal length fA shown in FIG. 9 (f1≦fA) or not is determined (step P2).

When f1≦fA, it is determined that the focal length f1 is in the rear focus zone, and a focus detecting data (i.e. defocus amount) detected by the AF sensor 201 of the camera body is read in (step P3). Then, a driving amount necessary to drive the third and fourth lens units L3 and L4 is calculated from the focus detecting data (step P4) and the necessary number of driving pulses are supplied to the lens actuator 150 by way of the driving circuit 108 to drive the third and fourth lens units L3 and L4 (step P5). Focus condition is determined (step P6) and when in-focus condition is not obtained, the process returns to step P3 to continue the focusing operation. When in-focus condition is obtained, the driving of the third and fourth lens units L3 and L4 is stopped (step P7) to end the processing.

When not f1≦fA at the determination of step P2, whether the set focal length f is between the focal length fB and the longest focal length condition T shown in FIG. 9 (f1>fB) or not is determined (step P11).

When f1>fA, it is determined that the focal length f1 is in the internal focus zone, and the focus detecting data (i.e. defocus amount) detected by the AF sensor 201 of the camera is read in (step P12). Then, a driving amount necessary to drive the second lens unit L2 is calculated (step P13) and the necessary number of driving pulses are supplied to the lens actuator 140 by way of the driving circuit 107 to drive the second lens unit L2 (step P14). Focus condition is determined (step P15) and when in-focus condition is not obtained, the process returns to step P12 to continue the focusing operation. When in-focus condition is obtained, the driving of the second lens unit L2 is stopped.

When not f1≧fB at the determination of step P11, it is determined that the set focal length f1 is in the internal/rear focus zone between the focal lengths fA and fB shown in FIG. 9, and the focus detecting data (i.e. defocus amount) detected by the AF sensor 201 of the camera is read in (step P21). Then, based on the focus detecting data, necessary driving amounts to move the second lens unit L2, the third lens unit L3 and the fourth lens unit L4 are read out from the memory such as a ROM (step P22) and the necessary numbers of driving pulses are supplied to the lens actuators 140 and 150 by way of the driving circuits 107 and 108 (step P23). Focus condition is determined (step P24) and when in-focus condition is not obtained, the process returns to step P21 to continue the focusing operation. When in-focus condition is obtained, the driving of the second, third and fourth lens units L2, L3 and L4 is stopped.

When the set focal length is at the focus zone changing point shown by fA and fB of FIG. 9, it is determined that the set focal length is in the rear focus zone or in the internal focus zone, and the lens is easily driven by driving only the lens actuator 150 or the lens actuator 140.

Subsequently, the zooming operation of the lens will be described. The lens of this embodiment is a lens of the vari-focal optical system. When the lens is not at the infinity position, the second, third and fourth lens units L2, L3 and L4 are moved out and moved in to perform focusing also during zooming. The moving out or moving in amounts of the lens units may be calculated according to the focal length in advance and stored in a memory such as a ROM or they may be obtained through a calculation every time the lens units are moved.

Figure 11:
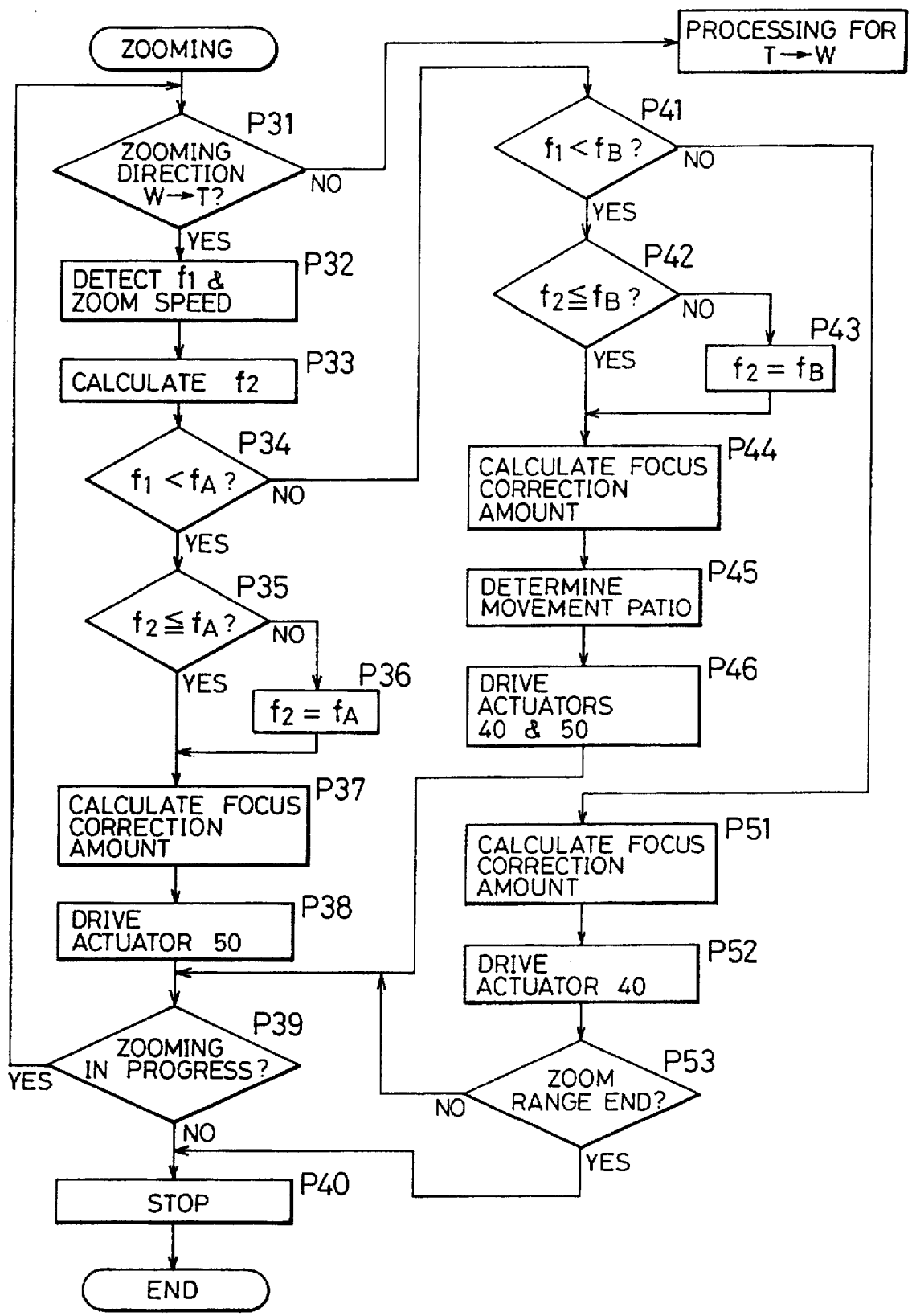
FIG. 11 is a flowchart of a zooming operation executed by the zoom lens controlling circuit.

Referring to FIG. 11, there is shown a flowchart of a zooming operation executed by the CPU 101. In this case, the lens is focused on a subject located at an finite distance, the focal length f1 set at that time is on the wide angle side of the focal length fA (i.e. f1≦fA), and the third and fourth lens units L3 and L4 are moved out toward the film surface by a distance d1. Thus, the set focal length f1 is in the rear focus zone.

In which direction the photographer rotated the zoom operation ring 112 is determined (step P31), and when it is determined that zooming is performed from the wide angle side to the telephoto side, a driving signal is outputted to the driving circuit 106 based on the direction and speed (zooming speed) of the rotation to start the drive of the zoom motor 125. The focal length f1 and the zooming speed of that time are detected (step P32) to calculate a target focal length f2 (step P33).

Whether the focal length f1 is shorter than the focal length fA which is a border value of the rear focus zone (f1<fA) or not is determined (step P34). When f1<fA, whether the target focal length f2 is equal to or shorter than the focal length fA which is a border value of the rear focus zone (f2≦fA) or not is determined (step P35). When not f2≦fA at the determination of step P35, the target focal length f2 is set to f2=fA (step P36).

A focus correction amount for focusing is read out from a memory or calculated (step P37) and the necessary number of driving pulses are supplied to the lens actuator 150 through the driving circuit 108 to drive the third and fourth lens units L3 and L4 (step P38).

Whether the zoom operation ring 113 is being operated or not is determined (step P39). When it is being operated, the process returns to step P31 to continue the zooming operation. When the ring 113 is not being operated, the zooming operation is stopped (step P40) to end the processing.

When not f1<fA at the determination of step P34, whether the set focal length f1 is shorter than the focal length fB which is a border value of the internal focus zone (f1<fB) or not is determined (step P41). When f1<fB, whether the target focal length f2 is equal to or shorter than the focal length B which is a border value of the internal focus zone (f2≦fB) or not is determined (step P42). When not f2≦fB at the determination of step P42, the target focal length f2 is set to f2=fB (step P43).

A focus correction amount for focusing is read out from a memory or calculated (step P44) and the movement ratio between the lens actuators 140 and 150 is determined (step P45). Then, the necessary numbers of driving pulses are supplied to the lens actuators 140 and 150 through the driving circuits 107 and 108 to drive the second lens unit L2 and the third and fourth lens units L3 and L4 (step P46).

The process goes to step P39 to determine whether the zoom operation ring 113 is being operated or not. When it is being operated, the process returns to step P31 to continue the zooming operation. When the ring 113 is not being operated, the zooming operation is stopped (step P40) to end the processing.

When not f1<fB at the determination of step P41, since the target focal length f2 is in the internal focus zone by the second lens unit, a focus correction amount is read out from a memory or calculated (step P51) and the necessary number of driving pulses are supplied to the lens actuator 140 through the driving circuit 108 to drive the second lens unit L2 (step P52). Whether the lens actuator 140 has reached an end of the zooming range or not is determined (step P53) and when it has reached the end of the zooming range, the zooming operation is stopped (step P40) to end the processing. When the actuator 140 has not reached the end of the zooming range, the process goes to step P39 to determine whether the zoom operation ring 113 is being operated or not. When it is being operated, the process returns to step P31 to continue the zooming operation. When the ring 113 is not being operated, the zooming operation is stopped (step P40) to end the processing.

When it is determined at step P31 that zooming is performed from the telephoto side to the wide angle side, in which focus zone the set focal length is included is determined to perform the processing. This processing will not be described as it is similar to the above-described processing.

As described above, according to the second embodiment, a plurality of lens units constituting the lens are each provided with a driving mechanism using the electromechanically transducing device and a predetermined lens unit of the plurality of the lens units is driven and set at a predetermined position based on the set focal length information and the defocus information, so that focusing is performed by an optimum lens unit according to the set focal length. As a result, the optical performance of the lens is improved. In addition, since no complicated cam mechanism is used, the structure of the lens is simple.

Obviously, many modifications and variations of the present invention are possible in light of the above teachings. It is therefore to be understood that within the scope of the appended claims, the invention may be practiced other than as specifically described.

What is claimed is:

1. A zoom lens system comprising:

a plurality of lens units movable along an optical axis to provide a variable focal length to the zoom lens system, wherein first to third focal length zones are set according to predetermined focal lengths of the zoom lens system, and wherein during focusing, in the first focal length zone, the lens units are moved at a first constant ratio of displacement along the optical axis, and in the third focal length zone, the lens units are moved at a second constant ratio of displacement along the optical axis which is different from the first constant ratio, and in the second focal length zone, a movement ratio of the lens units varies according to the focal length of the zoom lens system.

2. A zoom lens system as claimed in claim 1, wherein said movement ratio in the second focal length zone continuously varies with a change of the focal length across the second focal length zone.

3. A zoom lens system as claimed in claim 1, wherein said first to third focal length zones collectively provide a continuous focusing zone over the variable focal length of the zoom lens system.

4. A zoom lens system as claimed in claim 3, wherein said movement ratio in the second focal length zone varies from the first constant ratio to the second constant ratio.

5. A compact zoom lens system with improved focusing comprising:

a first lens unit;

a second lens unit;

a third lens unit; and a fourth lens unit, each of the lens units moving along an optical axis when the zoom lens system's focal length range changes from its most wide angle focal length position to its most telephoto focal length position, the focal length range being divided into a plurality of focal length zones; and means for focusing wherein at least one focal length zone has a movement ratio, for at least a pair of lens units for focusing and at least one intermediate focal length zone between two focal length zones wherein the lens units are moved at a different movement ratio according to the focal length relative to the adjacent focal length zones.

6. A zoom lens system comprising:

a plurality of lens units movable mounted to relatively vary their position along an optical axis to provide a variable focal length for the zoom lens system;

means for dividing the zoom lens system into at least a first focal length zone adjacent a wide angle position and a second focal length zone adjacent the first focal length zone;

means for moving at least a pair of lens units at a predetermined first constant ratio of displacement for focusing within the first focal length zone; and means for moving the same pair of lens units at a predetermined second constant ratio of displacement different from the first constant ratio, for focusing within the second focal length zone.

7. The zoom lens system of claim 6 further including means for moving the pair of lens units at an intermediate focal length zone between the first focal length zone and the second focal length zone wherein the pair of lens units are displaced at a predetermined variable ratio of movement to effectuate a transition in focusing movement between the first focal length zone and the second focal length zone.

8. The zoom lens system of claim 7 wherein the plurality of lens units are four lens units, and all four lens units move along the optical axis in a zooming mode of operation from the wide angle position to a telephoto position, while a first lens unit at an object side and a second lens unit on the image side of the first lens unit are the pair of lens units which are moved along the optical axis in accordance with the first constant ratio of displacement to provide a focusing mode of operation within the first focal length zone and are the first and second lens units moved along the optical axis in accordance with the second constant ratio of displacement to provide a focusing mode of operation within the second focal length zone.

9. The zoom lens system of claim 8 further including means for dividing the zoom lens system into a third focal length zone adjacent the telephoto position and further including means for moving the first lens unit only to provide a focusing mode of operation within the third focal length zone.

10. A four lens unit zoom lens system for providing a variable focal length across a zoom range from a wide angle position to a telephoto position comprising; along an optical axis from the object to image side:

a first lens unit;

second lens unit;

a third lens unit;

a fourth lens unit, each of the first through fourth lens units are relatively moved along the optical axis to provide a zooming mode of operation; and means for providing a focusing mode of operation in a first focal length zone adjacent the wide angle position, in a second intermediate focal length zone adjacent the wide angle position and in a third focal length zone adjacent the telephoto position, with the second intermediate focal length zone being also adjacent the third focal length zone including moving only the third and fourth lens units at a predetermined first constant ratio of displacement for focusing within the first focal length zone, moving only the second lens unit for focusing within the third focal length zone and moving the second, third and fourth lens units for focusing within the second intermediate focal length zone.

11. A compact zoom lens system for providing a variable focal length to the lens system with improved focusing comprising:

a first lens unit;

a second lens unit;

a third lens unit;

a fourth lens unit, each of the lens units moving along an optical axis when the zoom lens system's focal length range changes from its most wide angle position to its most telephoto position; and means for focusing the zoom lens system so that the zoom focal length range is divided into a plurality of separate focal length zones, each focal length zone having a movement ratio, for at least one of the lens units for focusing, set to constant values which are different from one focal length zone to an adjacent one, and at least one intermediate focal length zone between two focal length zones wherein at least two lens units are moved at a different movement ratio according to the focal length relative to the adjacent focal length zones.

* * * * *